United States Patent [19]
Whitehouse et al.

[11] Patent Number: 5,872,934
[45] Date of Patent: Feb. 16, 1999

[54] METHOD AND APPARATUS FOR CONNECTING SEVERAL VIDEO DISTRIBUTION UNITS TO A SERIAL DATA BUS

[75] Inventors: James Bruce Whitehouse, Brea; Bruce Robert Ferguson, Anaheim; Kaz Takata, Placentia; Kunjan Zaveri, Arcadia, all of Calif.

[73] Assignees: Sony Corporation, Tokyo, Japan; Sony Transcom Inc., Irvine, Calif.

[21] Appl. No.: 697,484

[22] Filed: Aug. 26, 1996

[51] Int. Cl.⁶ ........................................... G06F 13/00
[52] U.S. Cl. ..................... 395/281; 395/280; 370/85
[58] Field of Search ................ 395/281, 200.06, 395/200.02, 125; 370/85.5; 340/428; 380/25; 358/86; 317/135; 348/8, 144

[56] References Cited

U.S. PATENT DOCUMENTS

| | | | |
|---|---|---|---|
| 4,774,514 | 9/1988 | Hildebrandt et al. | 340/971 |
| 4,835,604 | 5/1989 | Kondo et al. | 358/86 |
| 4,866,515 | 9/1989 | Tagawa et al. | 358/86 |
| 5,029,209 | 7/1991 | Strong, Jr. et al. | 380/25 |
| 5,463,372 | 10/1995 | Mawyer, Sr. | 340/428 |
| 5,559,962 | 9/1996 | Okamura et al. | 395/200.06 |
| 5,568,484 | 10/1996 | Margis | 370/85.5 |
| 5,615,380 | 3/1997 | Hyatt | 395/800 |
| 5,617,331 | 4/1997 | Wakai et al. | 364/514 A |
| 5,745,159 | 4/1998 | Wax et al. | 348/8 |

*Primary Examiner*—Meng-Ai T. An
*Assistant Examiner*—Eric S. Thlang
*Attorney, Agent, or Firm*—Pasquale Musacchio; Jerry A. Miller

[57] ABSTRACT

A technique and system for isolating segments of a serial data bus for remote configuration of equipment in in-flight entertainment systems. The system allows the automatic initialization, or configuration, of multiple terminal units, attached to a serial data bus, without requiring physical access to the multiple units.

15 Claims, 2 Drawing Sheets

METHOD AND APPARATUS FOR CONNECTING SEVERAL VIDEO DISTRIBUTION UNITS TO A SERIAL DATA BUS

BACKGROUND

1. Field of the Invention

This invention relates generally to a technique for isolating segments of a serial data bus. More particularly, this invention relates to an automatic system for initializing, or configuring, multiple terminal units, attached to a serial data bus, without requiring physical access to the plurality of remote terminal units, each of which may be located at or near a passenger seat of a passenger vehicle, such as an aircraft, train or bus, for example, or in a theater or stadium or the like.

2. Background of the Invention

In-flight entertainment systems commonly installed in modern passenger aircraft provide both increased passenger satisfaction as well as a revenue stream to airlines, by making a number of entertainment options available to the passengers. Well-known systems such as those shown, for example, in U.S. Pat. Nos. 4,866,515 (Tagawa) and 4,835,604 (Kondo), disclose a number of methods of providing audio and video in-flight entertainment to airline passengers.

It should be appreciated that the need to have the ability to easily and quickly configure each of the individual units or components, of an in-flight entertainment system, once installed in an aircraft, is invaluable. For example, in many instances the misconfiguration of a component in an in-flight entertainment system will result in the need for corrective action which requires disassembly of interior aircraft cabin panels. These corrective actions may result in aircraft departure delays, or, the misconfigured component may cause the entire system to be inoperative. Even if the initial installation of the system is correctly performed, the maintenance and upkeep of the system normally requires periodic physical access to the individual components.

Although various manual methods of addressing and configuration of individual video distribution units have been known for quite awhile, the problem of manually performing these functions has become more significant in the recent past in view of the increase in complexity of onboard electronic systems and the decrease in space and weight allotted to such systems. These factors greatly increase the cost, in both time and equipment, in both installation and maintenance of the system.

Known methods of initializing individual units attached to a serial data bus include physically accessing each unit and configuring each unit manually with, for example, DIP switch settings, internal configuration jumpers or plugs, jumpers in the cable harness, etc. However, as discussed, the standard "manual" approaches are both uncertain and inefficient. The present invention addresses each of these needs.

SUMMARY OF THE INVENTION

It is an object of the present invention to provide serial data bus segmentation, at the design stage, for remote configuration of equipment in in-flight entertainment systems.

It is another object of the present invention to provide a system which utilizes a serial data bus and multiple individual terminal units attached to the data bus. The system, under software control from a central transmitting device or a "System Control Unit", may selectively initialize (with address and configuration data) each individual terminal unit attached to the serial data bus.

It is an advantage that the system greatly decreases the cost of installation and maintenance of entertainment systems by removing the need for future physical access and manual labor for initialization for a plurality of terminal units mounted at respective passenger seats in, for example, an aircraft. In this type of system, since there is no need for physical alterations or configurations, each unit remains physically (and hence logistically) identical, again, greatly reducing installation and maintenance tasks.

These and other objects, advantages and features of the invention will become apparent to those skilled in the art upon consideration of the following description of the invention.

In one aspect of the present invention a serial data bus segmentation system enables the remote configuration of a plurality of units at different locations by a single system control unit.

According to another aspect of the present invention, a system for serial data bus segmentation provides a method for the remote configuration of equipment, and, in a preferred embodiment, the system is applied to an in-flight entertainment system having a system control unit (SCU) and multiple smart video distribution units (SVDU's) which are linked via a serial data bus.

It is a further object of the present invention to provide a microprocessor-based SCU, multiple SVDU's and a termination network $Z_T$. The serial data bus physically passes through each SVDU via a normally-closed DPDT relay. The SVDU opens or closes the DPDT relay based on a command from the SCU. Each SVDU contains a internal termination network. Upon the "opening" of the DPDT relay, the serial data bus is connected to the internal termination network.

A method for operation of a serial data bus segmentation system according to the present invention includes the steps of: monitoring for an input "reset" command; upon "reset" command, activating a reset signal from the SCU to each SVDU, alerting each unit to reset to default conditions and assume the default address; opening the relay at each SVDU; transmitting, from the SCU, a "status request", requesting any SVDU at the default address to respond; transmitting an "assign new address" command from the SCU to any responsive SVDU, specifying a new address to that unit; sending configuration commands from the SCU to configure any features of the responsive SVDU; when complete, commanding the SVDU to close its DPDT relay, thereby connecting the next SVDU; continuing the process of initialization and configuration for each remaining SVDU until a determination is made that there are no longer any units containing the initial default address; returning the system to normal operation.

The features of the invention believed to be novel are set forth with particularity in the appended claims. The invention itself however, both as to organization and method of operation, together with further objects and advantages thereof, may be best understood by reference to the following description of the invention, taken in conjunction with the accompanying drawings.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
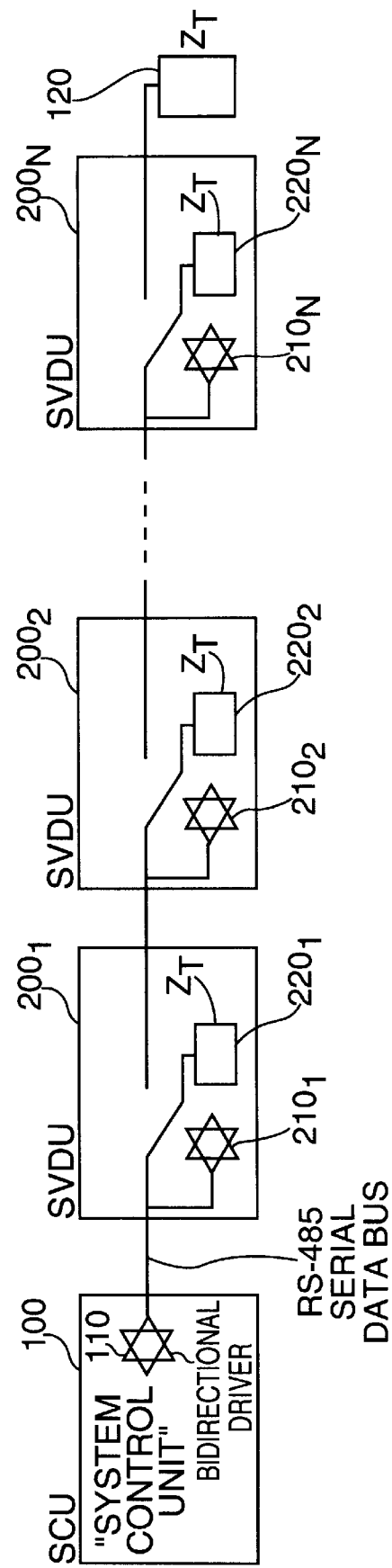
FIG. 1 illustrates a block diagram of a serial data bus segmentation system according to a preferred embodiment of the present invention.

While this invention is susceptible of embodiment in many different forms, there is shown in the drawings and will herein be described in detail, specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

A method and system for achieving serial data bus segmentation for remote configuration of equipment in in-flight entertainment systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A system for isolating segments of a serial data bus by software control, to selectively initialize individual components attached to the bus, eliminates the need for physical access to the components. The bus physically passes from a main system control unit through each component or unit attached to the main system control unit via a normally closed DPDT relay. Each DPDT relay opens and closes in accordance with commands from the main system control unit.

A "reset" command from the main system control unit to each of the components attached to the bus "opens" each of the DPDT relays, thereby truncating the daisy-chain and opening the bus after each individual component. Only the first component remains attached to the main system control unit, which then assigns a new address to the first component, together with any additional configuration data. The main system control unit then instructs the first component to close its relay, thereby also connecting the main system control unit to the second component attached to the bus.

Each of the remaining components has previously received the reset command from the main system control unit, and therefore each will respond to the "default individual address" assigned to it at the time it received the reset command. This enables each unit to individually and serially be connected to the main system control unit and to respond accordingly to the commands from the main unit to initialize and configure each separate component.

A block diagram of a serial data bus segmentation system according to a preferred embodiment of the present invention is illustrated in FIG. 1. The system is shown to include a System Control Unit 100, which is serially connected such that it physically passes through each of multiple Smart Video Distribution Units $200_1$, $200_2$,...$200_N$, via a serial data bus (in a preferred embodiment the RS-485 serial data bus in utilized). In particular, as shown, the serial data bus passes through each SVDU via a normally closed DPDT relay. The SCU 100 contains a bidirectional driver 110, and each SVDU, $200_1$, $200_2$,...$200_N$, also contains a bidirectional driver, $210_1$, $210_2$,...$210_N$, respectively. The SCU 100 is connected via the RS-485 serial data bus through each SVDU, $200_1$, $200_2$,...$200_N$, and terminates with a termination network $Z_T$, 120 (the termination network $Z_T$ consists of a capacitance in series with a resistance; one skilled in the art will appreciate that this termination is required to ensure reliable operation of the RS-485 serial data bus). In addition, each SVDU contains an internal termination network $Z_T$ each respectively identified as $220_1$, $220_2$,...$220_N$.

Figure 2:
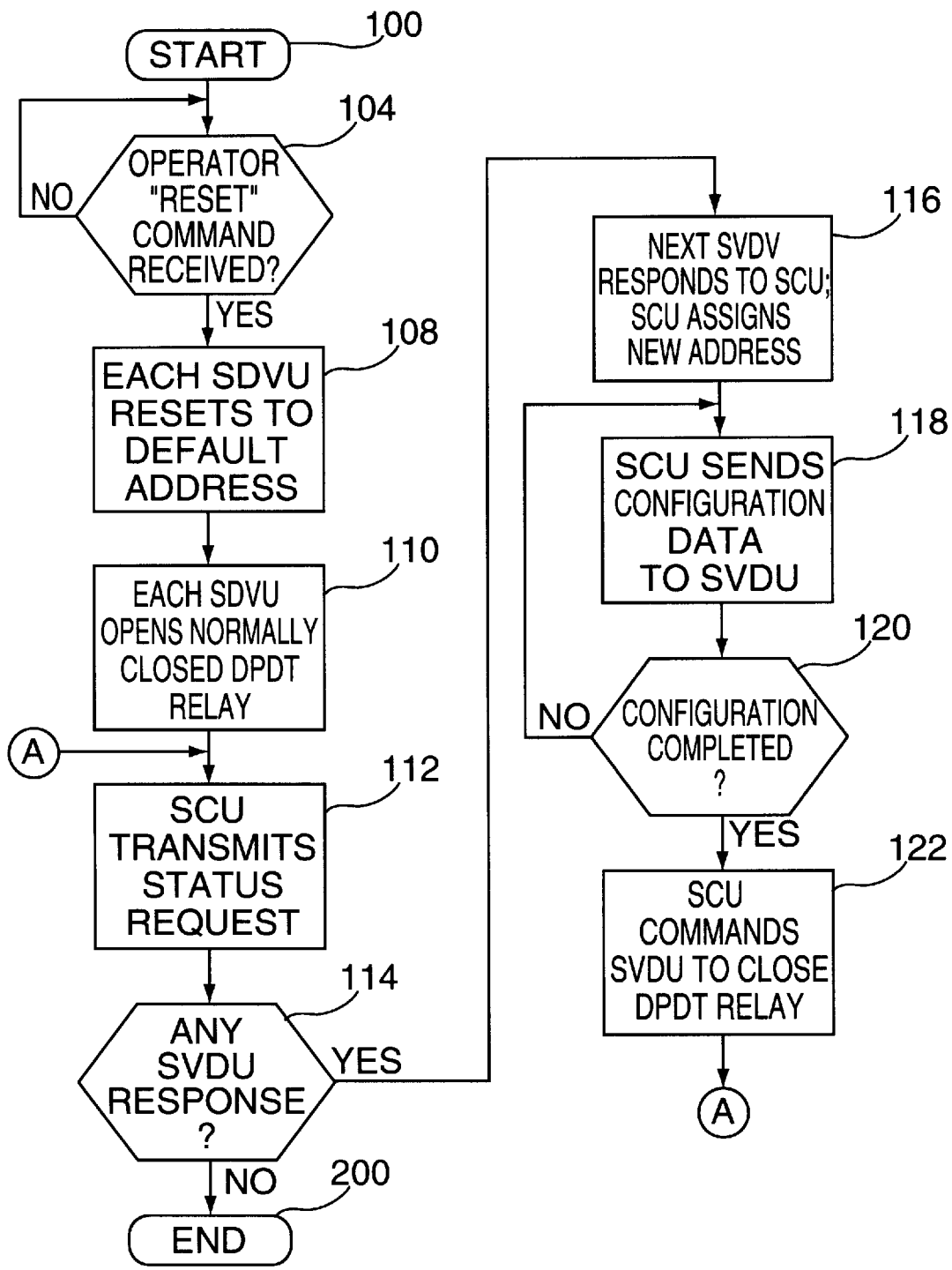
FIG. 2 is a flowchart depicting a method of utilizing the serial data bus segmentation system, as illustrated in FIG. 1, to perform an initialization operation in accordance with the present invention.

The operation of the system described in detail above (with reference to FIG. 1) is best explained with reference to the flow chart shown in FIG. 2. When a serial data bus segmentation system according to the present invention is under "normal operation" (i.e. when there is no need to update address or configuration data), an RS-485 bus physically passes through each of multiple SVDU's via a normally closed DPDT relay. In Step 104, the System Control Unit continues to monitor whether or not an operator "reset" command has been input. If a reset command has not been received in Step 104, the system returns to Step 100 and maintains its normal operation.

When it is determined that an operator command has been input at Step 104, the System Control Unit activates a reset command signal to each SVDU alerting each unit to reset to default conditions and assume the default address (which is the same for each SVDU) (see Step 108).

After resetting to the default address, in Step 110 each SVDU opens its RS-485 DPDT daisy-chain relay, thereby truncating the daisy-chain and breaking the RS-485 bus after each and every SVDU (note that when "opened", the relay connects the bus to the internal termination network $Z_T$ ($220_{1-N}$) to render the bus operable).

Once each SVDU has received the reset command, has reset to the default address in Step 108, and, has opened the DPDT relay in Step 110, in Step 112 the SCU transmits a "status request", requesting any SVDU at the default address to respond to the request (since each of the SVDU units has opened its DPDT relay, initially only the "first" of the SVDU's connected to the SCU will receive the status request).

In Step 114, a determination is made as to whether any response is received from the SCU status request. If no response is received, the process is terminated, as any SVDU will have been assigned a new address and configuration data. If however a "first" SVDU responds to the SCU, the SCU then transmits an "assign new address" command to that SVDU, specifying a new system-unique individual address to that unit (Step 116). The SCU then continues in Step 118 to send configuration commands to configure any features of the first SVDU. If the SCU is not completed with its configuration of the SVDU connected to the RS-485 in Step 120, it returns to Step 118. When the configuration is determined to be complete, in Step 122, the SCU commands the SVDU to close its DPDT relay, thereby connecting the next SVDU to the SCU over the RS-485 bus.

The next, or second in this case, SVDU still contains the initial default address to which each SVDU was reset in Step 108. Accordingly, the process of initialization and configuration for each and every remaining SVDU continues in the same manner. Specifically, upon each closing of a DPDT relay in Step 122, the process returns to Step 112, wherein the SCU transmits a status request. Only one SVDU can respond at any given time, as only one connected unit will have the initial default address. As each unit is assigned a new address, it then closes its relay, thereby connecting an additional SVDU which contains the initial default address.

The process continues until Step 114 determines that there are no longer any units containing the initial default address (i.e., after each SVDU has been assigned a new address and all configuration commands). At this point, every SVDU has been individually and consecutively connected to the SCU and has received a new unique address and configuration data appropriate to each unit. The "reset" configuration process then proceeds to end at Step 200, at which point the system returns to normal operation.

The advantages obtained by the ability to remotely configure, or initialize, individual components attached to a serial data bus, provided by the present invention, are ideal for use in any application that requires such initialization of multiple units. For example, entertainment or multimedia systems provided for passenger use in ships and buses could also benefit from use of the present invention. In particular, in an in-flight entertainment system, the misconfiguration of a component in the system results in time-consuming corrective action, requiring the disassembly of interior aircraft cabin panels. Aircraft in-flight entertainment systems have been used as an example of a field which would benefit significantly from the present invention. However, the present invention is not limited to any specific field of use.

Thus, it is apparent that in accordance with the present invention, a system, and method of using that system, that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A serial data bus segmentation system comprising:
   a system control unit:
   a plurality of terminal apparatus units, each of said plurality of terminal apparatus units containing a video distribution unit and an internal termination network comprising a capacitance in series with a resistance: and
   a system termination unit, wherein said system control unit is linked to each of said plurality of terminal apparatus units by a serial data bus, and further wherein the serial data bus is terminated with said system termination unit, and further wherein the serial data bus physically passes through each of said plurality of terminal apparatus units and is electrically connected to a normally-closed double-pole double-throw (DPDT) relay, whereby when said DPDT relay is closed by a signal from said system control unit said video distribution unit is connected to said serial data bus and when said DPDT relay is opened said internal termination network is connected to said serial bus.

2. The serial data bus segmentation system according to claim 1, wherein said system termination unit comprises a capacitance in series with a resistance.

3. The serial data bus segmentation system according to claim 1, wherein said system control unit comprises a microprocessor-based system controller.

4. The serial data bus segmentation system according to claim 1, wherein upon receipt of a reset command by said system control unit, said system automatically configures each of plurality of individual units.

5. The serial data bus segmentation system according to claim 4, wherein said system automatically configures each of said plurality of individual units by first resetting each of said plurality of terminal apparatus units to a default address.

6. The serial data bus segmentation system according to claim 5, wherein after resetting each of said plurality of terminal apparatus units to a default address, said system opens the normally-closed DPDT relay after each of said plurality of terminal apparatus units.

7. A serial data bus segmentation system according to claim 6, wherein the normally-closed DPDT relay connects the serial data bus to each corresponding internal termination network when the DPDT relay is open at a terminal apparatus unit.

8. A serial data bus segmentation system according to claim 7, wherein
   (a) said system control unit transmits a status request to said plurality of terminal apparatus units requesting a response from any of said plurality of terminal apparatus units having the default address;
   (b) a terminal apparatus unit responds to said system control unit;
   (c) said system control unit transmits a new address and configuration data to the terminal apparatus unit which responded in step (b);
   (d) said system control unit commands the terminal apparatus unit reconfigured in step (c) to close its DPDT relay, upon which a subsequent terminal apparatus is connected to the system control unit;
   (e) steps (a) through (d) are repeated for the remainder of the plurality of terminal apparatus units, in succession, linked to said system control unit.

9. A method of isolation a plurality of terminal apparatus units attached to a system control unit via a serial data bus, for remote configuration of the terminal apparatus units, comprising the steps of:
   (a) receiving a reset command at the system control unit;
   (b) transmitting the reset command to the plurality of terminal apparatus units over the serial data bus;
   (c) automatically resetting each of the plurality of terminal apparatus units to a default address;
   (d) automatically opening a normally-closed DPDT relay at each of the plurality of terminal apparatus units such that the serial data bus is truncated after each terminal apparatus unit;
   (e) transmitting a status request, from the system control unit to the plurality of terminal apparatus units and requesting a response from any of the plurality of terminal apparatus units having the default address;
   (f) receiving a response at the system control unit from a single terminal apparatus unit;
   (g) transmitting a new address and configuration data from the system control unit to the terminal apparatus unit which responded in step (f);
   (h) transmitting a command, from the system control unit, to the terminal apparatus unit reconfigured in step (g), to close the normally-closed double-pole double-throw (DPDT) terminal apparatus unit, upon which a subsequent terminal apparatus is connected to the system control unit and over the serial bus;

(i) repeating steps (e) through (h) for remaining ones of the plurality of terminal apparatus units, in succession, linked to the system control unit over the serial data bus.

10. A method according to claim 9, wherein the plurality of terminal apparatus units each contains an internal termination network.

11. A method according to claim 9, wherein the serial data bus is terminated with a system termination unit.

12. A method according to claim 10, wherein each internal termination network comprises a capacitance in series with a resistance.

13. A method according to claim 11, wherein the system termination unit comprises a capacitance in series with a resistance.

14. A method according to claim 9, wherein the system control unit comprises a microprocessor-based system controller.

15. A method according to claim 9, wherein the normally-closed DPDT relay connects the serial data bus to each corresponding internal termination network when the DPDT relay is open at a terminal apparatus unit.

* * * * *